US011394186B2

(12) United States Patent
Sugiyama et al.

(10) Patent No.: US 11,394,186 B2
(45) Date of Patent: Jul. 19, 2022

(54) ELECTRIC CONNECTION BOX

(71) Applicant: YAZAKI CORPORATION, Tokyo (JP)

(72) Inventors: Takashi Sugiyama, Makinohara (JP); Kuninori Suzuki, Makinohara (JP); Norio Watanabe, Makinohara (JP); Yuji Sashida, Makinohara (JP); Toshihisa Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/096,906

(22) Filed: Nov. 12, 2020

(65) Prior Publication Data

US 2021/0143620 A1    May 13, 2021

(30) Foreign Application Priority Data

Nov. 13, 2019    (JP) .............................. JP2019-205561

(51) Int. Cl.
*H02G 3/08* (2006.01)
*B60R 16/023* (2006.01)
*H02G 3/14* (2006.01)

(52) U.S. Cl.
CPC .......... *H02G 3/081* (2013.01); *B60R 16/0238* (2013.01); *H02G 3/14* (2013.01)

(58) Field of Classification Search
CPC .......... H02G 3/08; H02G 3/081; H02G 3/088; H02G 3/16; H02G 3/14; H05K 5/00; H05K 5/02; H05K 5/04; B60R 16/00; B60R 16/0239; B60R 16/02; B60R 16/0238; H01H 9/02; H01H 9/04

USPC .................. 174/50, 520, 500, 59, 559, 560; 439/76.1, 76.2, 949, 535; 361/600, 601, 361/679.01, 730, 752; 220/3.2–3.9, 4.02
See application file for complete search history.

(56) References Cited

U.S. PATENT DOCUMENTS

| 6,455,768 B2* | 9/2002 | Negishi | .................. H05K 5/061 |
| | | | 174/50 |
| 6,545,217 B2* | 4/2003 | Sato | ........................ H02G 3/088 |
| | | | 174/50 |
| 7,077,281 B2* | 7/2006 | Sato | ........................ H02G 3/10 |
| | | | 220/3.8 |

(Continued)

FOREIGN PATENT DOCUMENTS

| JP | 2001-72116 A | 3/2001 |
| JP | 2003-219539 A | 7/2003 |

*Primary Examiner* — Angel R Estrada
(74) *Attorney, Agent, or Firm* — Kenealy Vaidya LLP

(57) ABSTRACT

An electric connection box includes a housing having an opening and side walls, a lock protruding plate, a lid having a hanging wall having a hanging wall lower end surface and a hook, lock portions, a rotation tip end portion of the lid being provided between the lock portions, an annular packing, a step portion and a cutout portion provided on the hanging wall on a first portion of the lid, the first portion comprising the rotation tip end portion. The cutout portion is formed by cutting a lower tip end of the hanging wall such that a first clearance between the hanging wall lower end surface and the step portion at the first portion is larger than a second clearance between the hanging wall lower end surface and the step portion at a second portion of the lid, the second portion being different from the first portion.

7 Claims, 11 Drawing Sheets

(56) References Cited

U.S. PATENT DOCUMENTS

| | | | | |
|---|---|---|---|---|
| 7,762,415 B2* | 7/2010 | Matsui | ................ | H05K 5/0069 |
| | | | | 174/58 |
| 8,052,001 B2* | 11/2011 | Chen | ...................... | H05K 5/066 |
| | | | | 220/4.02 |
| 8,210,378 B2* | 7/2012 | Takeuchi | ............... | H02G 3/088 |
| | | | | 174/50.5 |
| 8,785,775 B2* | 7/2014 | Takeuchi | ............ | B60R 16/0239 |
| | | | | 174/50 |
| 8,813,984 B2* | 8/2014 | Satoh | ................ | B60R 16/0238 |
| | | | | 220/4.21 |
| 8,915,394 B2* | 12/2014 | I | .......................... | B60R 16/0239 |
| | | | | 220/378 |
| 9,099,850 B2* | 8/2015 | Kakimi | .................... | H01H 9/04 |
| 10,644,490 B2* | 5/2020 | Kawamura | .............. | H02G 3/16 |
| 11,165,233 B2* | 11/2021 | Ohtsuka | ............... | B60R 16/0238 |
| 2003/0136780 A1 | 7/2003 | Sato et al. | | |

* cited by examiner

ELECTRIC CONNECTION BOX

CROSS-REFERENCE TO RELATED APPLICATION

The present application claims priority to Japanese Patent Application No. 2019-205561 filed on Nov. 13, 2019, the entire content of which is incorporated herein by reference.

TECHNICAL FIELD

The present disclosure relates to an electric connection box.

BACKGROUND

A related art electric connection box is mounted on a vehicle to accommodate electrical components (for example, see JP2001-72116A). As illustrated in FIG. 9, this type of electric connection box 501 includes a lid 507 (upper case) fitted into an opening 505 (see FIG. 11) of a housing 503 (lower case) that accommodates electrical components. As illustrated in FIG. 10, the lid 507 has substantially the same outer shape as the housing 503 in a plan view. As illustrated in FIG. 11, the lid 507 includes a hanging wall 511 that covers an outer side of a side wall 509 of the housing 503. An annular packing 513 is attached on an inner periphery of the lid 507. An upper end of the side wall 509 of the housing 503 serves as a packing abutment end surface 515. When the lid 507 covers the housing 503 from above, a plurality of lock portions 517 provided on all sides of the housing 503 and the lid 507 between the housing 503 and the lid 507 are locked, so that the packing 513 abuts against the packing abutment end surface 515 and elastically deforms. As a result, the electric connection box 501 is sealed watertightly between the lid 507 and the opening 505. The housing 503 includes a step portion 519 on an outer surface of the side wall 509. A hanging wall lower end surface 521 abuts the step portion 519 with no clearance C (C=0). As a result, water hardly enters the electric connection box 501 from a gap between the outer surface of the side wall 509 and the hanging wall 511, which is upstream of the packing 513 in a water intrusion direction (i.e., the hanging wall lower end surface 521 and the step portion 519 abutting each other prevents water from entering the electric connection box 501 before the packing 513 prevents water from doing so).

As another type of the electric connection box 501, there is a rotational fitting electric connection box in which the lid 507 is fitted to the housing 503 by being pivoted about a rotational axis 523 which is along one side of the lid 507. In the rotational fitting electric connection box, unlike a vertical filling electric connection box (i.e. unlike a electric connection box in which the lid is attached to the housing vertically) in which the entire periphery of the packing 513 is pressed at the same time, the packing 513 gradually comes into contact with and is pressed against the packing abutment end surface 515 from a rotation base portion side. Therefore, a repulsive force of the packing 513 gradually increases toward a rotation tip end portion side. As a result, when a rotation tip end portion is pressed against the housing 503, the lid 507 may be deformed between a rotation base portion and the rotation tip end portion due to the repulsive force of the packing 513. When the lid 507 is deformed, the hanging wall lower end surface 521 of the rotation tip end portion abuts against the step portion 519 first, making further pressing impossible. In this state, due to a deformation, it may be more difficult for the hanging wall lower end surface 521 of the lid 507 to abut the step portion 519 on the rotation base portion side than on the rotation tip end portion. In this case, the lock portions 517 in the vicinity of the rotation tip end portion (for example, two lock portions 517 at upper and lower portions on a right side in FIG. 10) may not reach positions at which a reliable lock of the lock portions can be realized, and the lid 507 may end at being in a half-fitted state.

SUMMARY

Illustrative aspects of the present invention provide an electric connection box configured to prevent half-fitting of a lid.

According to an illustrative aspect of the present invention, an electric connection box includes a housing having an opening in a polygonal shape and a plurality of side walls, each having a packing abutment end surface on an upper end, a lock protruding plate protruding from an outer surface of one of the plurality of side walls, the one defining a side of the opening, a lid including a hanging wall having a hanging wall lower end surface and a hook having a frame shape, the lid being configured to be rotationally fitted to the housing, a pair of lock portions configured to fix the lid to the plurality of side walls and provided on two positions on each of the lid and the housing, a rotation tip end portion of the lid being provided between the two positions, an annular packing configured to be attached on an inner peripheral side of the hanging wall, a step portion formed on the outer surface of each of the plurality of side walls and configured to, when the lid is attached to the housing, abut the hanging wall lower end surface and a cutout portion provided on the hanging wall on a first portion of the lid, the first portion including the rotation tip end portion. The hanging wall is configured to, when the lid is attached to the housing, cover an outer side of each of the plurality of side walls. The hook is provided on the hanging wall and configured to be engaged with the lock protruding plate. A rotational axis runs through the hook engaged with the lock protruding plate. The lid is configured to be rotated to cover the opening about the rotational axis and to be fitted to the housing is formed by cutting a lower tip end of the hanging wall such that a first clearance between the hanging wall lower end surface and the step portion at the first portion is larger than a second clearance between the hanging wall lower end surface and the step portion at a second portion of the lid when the lid is attached to the housing, the second portion being different from the first portion.

Other aspects and advantages of the invention will be apparent from the following description, the drawings and the claims.

DESCRIPTION OF EMBODIMENTS

Figure 1:
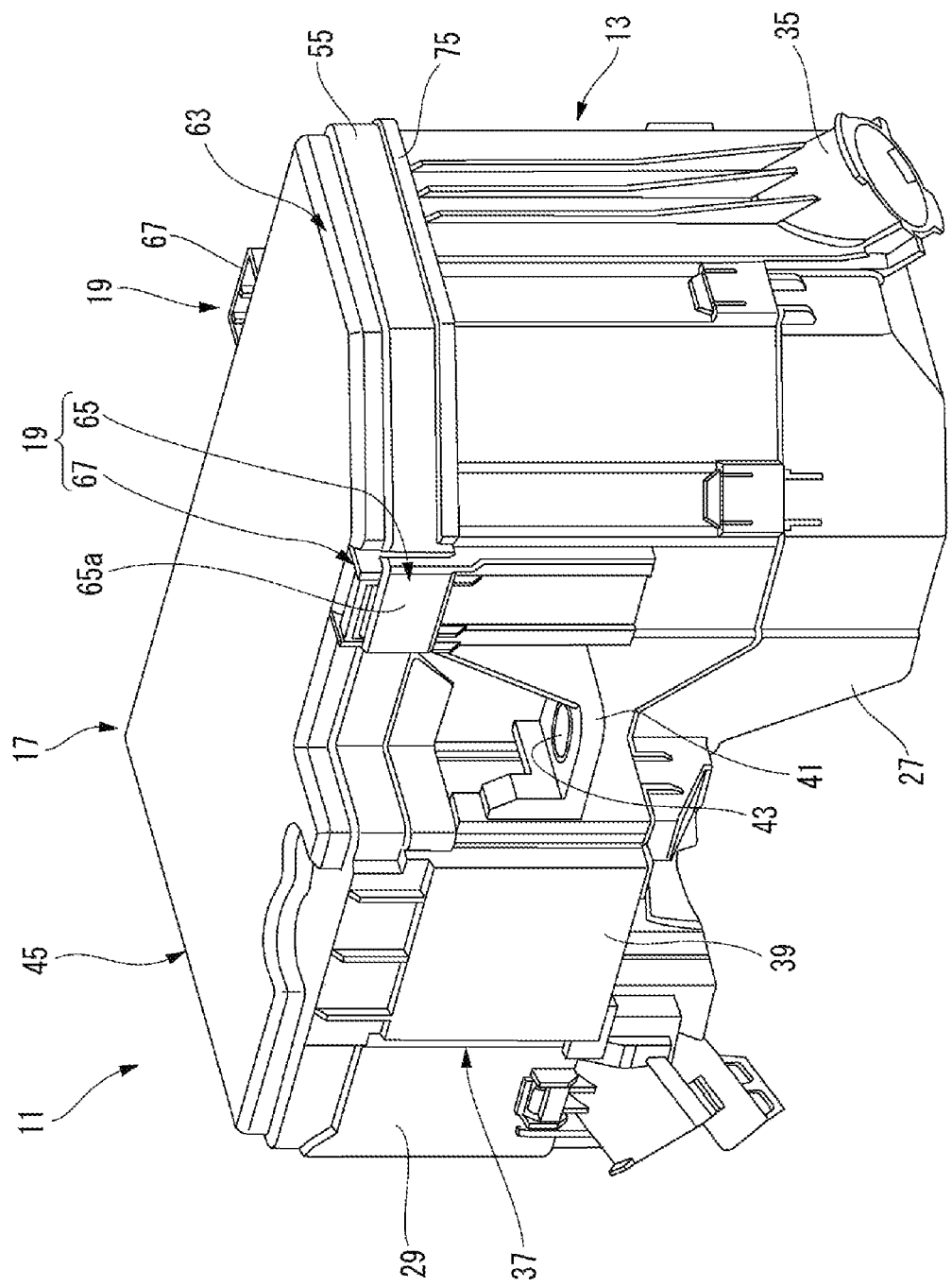
FIG. 1 is a perspective view illustrating an external appearance of an electric connection box according to an embodiment of the present disclosure.

Hereinafter, an embodiment according to the present disclosure will be described below with reference to the drawings. FIG. 1 is a perspective view illustrating an external appearance of an electric connection box 11 according to the embodiment of the present disclosure. The electric connection box 11 according to the present embodiment is mounted on a vehicle, for example, and is interposed between a power supply (secondary battery) (not illustrated) of the vehicle and an electronic device to adjust power supplied from the power supply to the electronic device. The electric connection box 11 may also be referred to as a relay box, a fuse box, a junction box, or the like.

The electric connection box 11 according to the present embodiment includes a housing 13, lock protruding plates 15 protruding from an outer surface of a side wall 29 of the housing 13, a lid 17, a pair of lock portions 19 provided or located between the lid 17 and the housing 13, a packing 21 attached on the lid 17, a step portion 23 formed on the outer surface of the side wall 29, and a cutout portion 25 formed on a hanging wall 55 of the lid 17.

The housing 13 has a box shape having the side walls 29 (also referred to as a frame) and includes an under cover 27 attached at a lower portion thereof. Upper ends of the side wall 29 serve as sides defining an opening 31 (see FIGS. 2 and 5) that opens in a polygonal shape. The upper ends of the side wall 29 serve as a packing abutment end surface 33 against which the packing 21 (see FIG. 3) attached on the lid 17 is to abut. The housing 13 and the under cover 27 are formed of an insulating resin.

The housing 13 accommodates a plurality of electronic components (not illustrated). The electronic components accommodated in the housing 13 include, for example, a relay, a fuse, or a fusible link. Each of the electronic components includes an electronic component body (not illustrated) such as a relay body or a fuse body disposed inside the housing 13, and a plurality of terminals (not illustrated) that are electric connection portions electrically connected to the electronic component body. The terminals of the electronic component are electrically connected to electric wires (not illustrated). In the present specification, the electronic components, the terminals, the electric wires, and the like are collectively referred to as electrical components.

One end portion of an electric wire is connected to a terminal of an electronic component, and the other end portion is connected to the power supply (secondary battery) or the electronic device. The electric wire is drawn out to the outside of the housing 13 from a tubular electric wire insertion portion 35 formed on the housing 13. The plurality of electric wires drawn out from the housing 13 are bundled together by an exterior member such as an adhesive tape or a corrugated tube.

The side wall 29 of the housing 13 includes a cable connection portion 37 to which a power supply cable is to be connected. The cable connection portion 37 includes a terminal connection portion (not illustrated). A terminal attached to an end of the power supply cable is connected to the terminal connection portion. The cable connection portion 37 has its upper portion and side portion covered by a protective wall 39 that is formed on the lid 17 and hangs in parallel with the side wall 29 when the lid is attached to the housing 13. The cable connection portion 37 covered by the protective wall 39 leads the power supply cable out from below the protection wall 39.

The housing 13 includes a plurality of (two in this embodiment) fixing brackets 41 protruding vertically from the side wall 29. Each of the fixing brackets 41 has a bolt insertion hole 43 running therethrough. A bolt inserted into the bolt insertion hole 43 is to be fastened to a body panel, so that the electric connection box 11 is fixed in a predetermined position of an engine compartment, for example.

Figure 2:
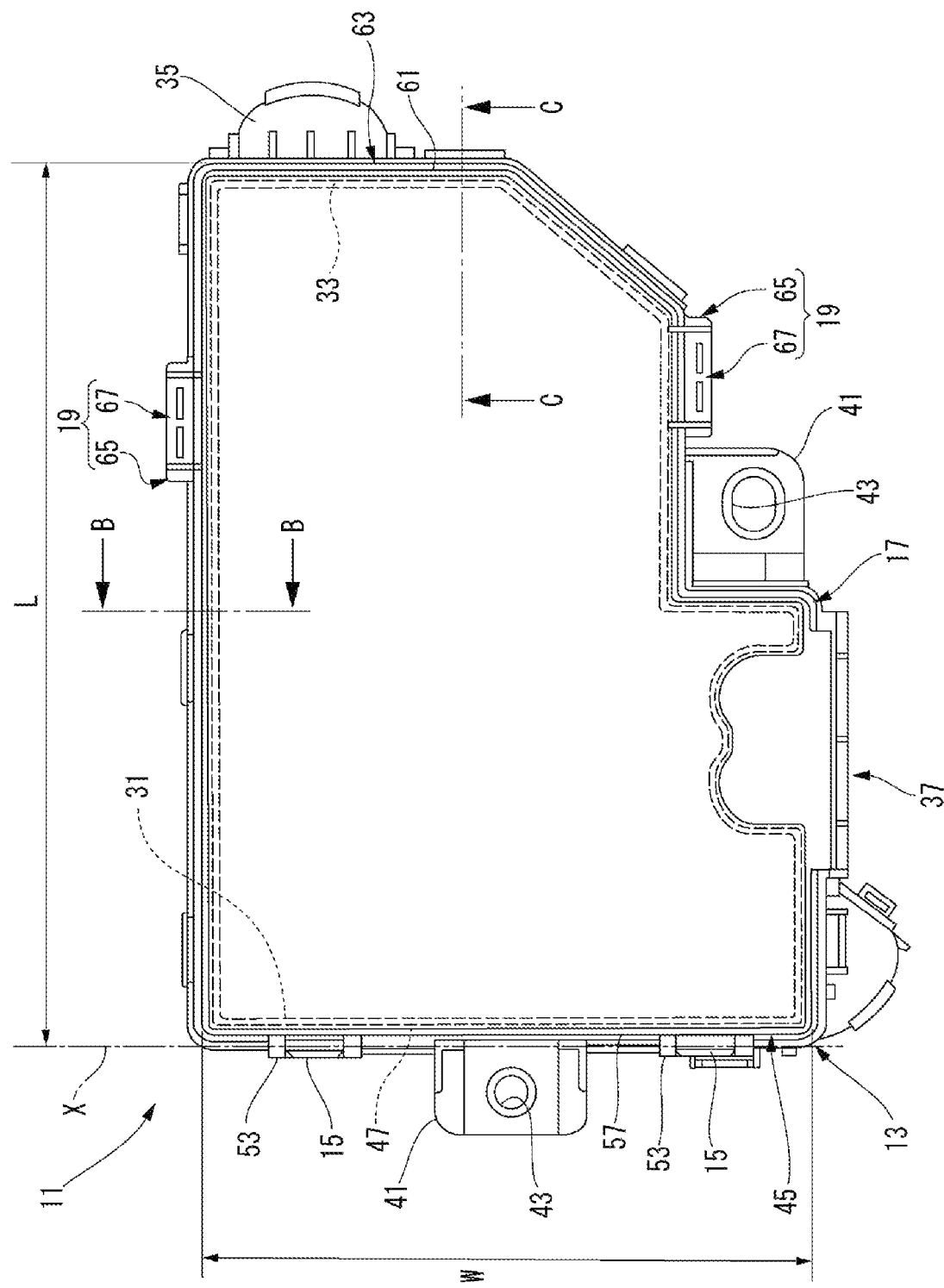
FIG. 2 is a plan view of the electric connection box shown in FIG. 1.

FIG. 2 is a plan view of the electric connection box 11 in FIG. 1. Here, the opening 31 and the lid 17 of the housing 13 have substantially similar shapes in a plan view. In the present embodiment, the polygonal shape is a heptagon obtained by cutting one corner portion of a rectangular shape by a quadrangle to form a recess and chamfering a newly formed corner portion by the cut to form a hypotenuse. One of seven sides of the heptagon is a hypotenuse and the other sides are connected at right angles to adjacent sides. In addition, one corner portion of the polygon is an inside corner and the other corners are outside corners. The polygon is an example, and the shape of the electric connection box 11 according to the present embodiment is not limited to polygon.

Figure 3:
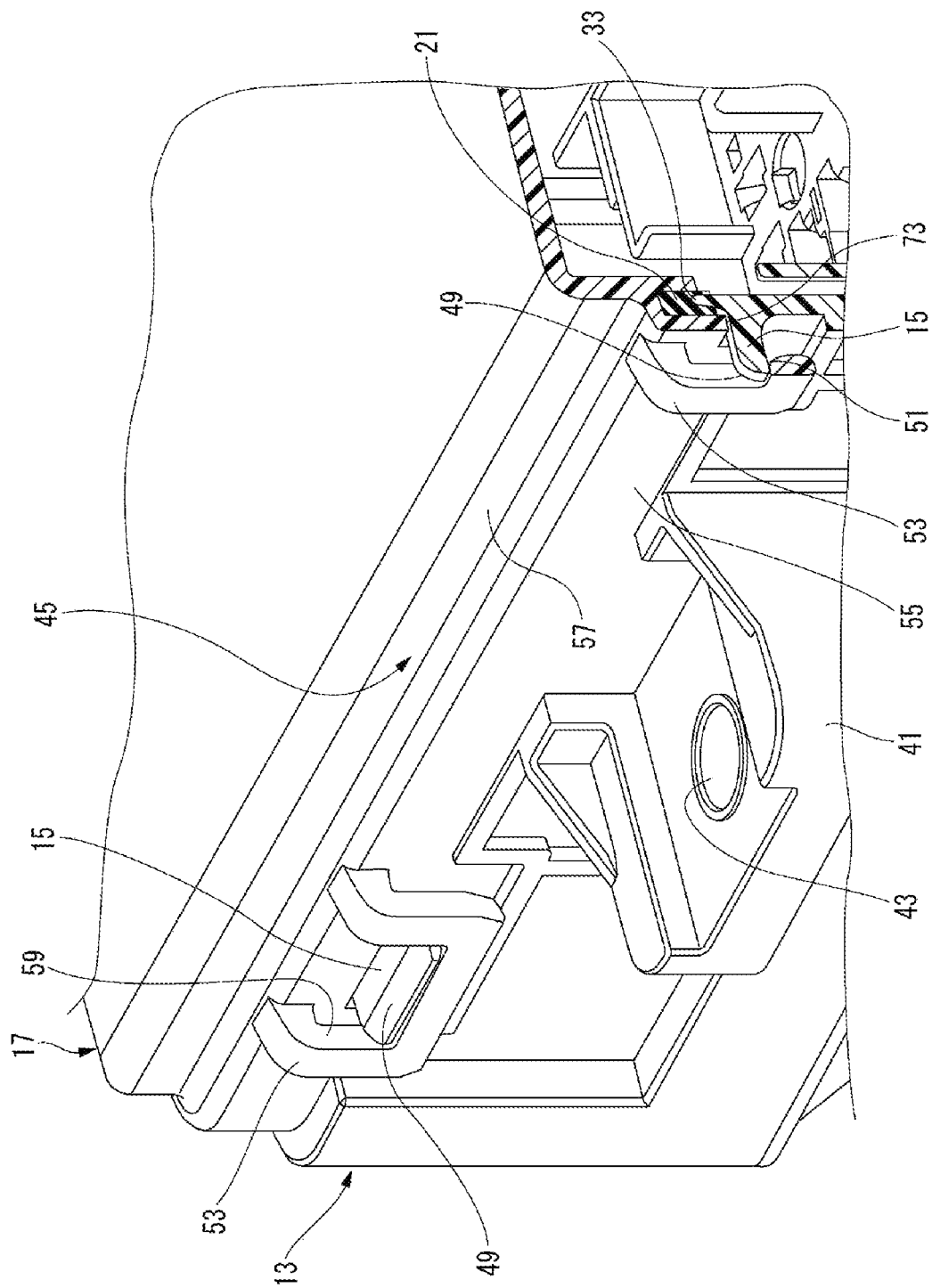
FIG. 3 is a perspective view of a main portion obtained by cutting a part representing a rotation base portion of a lid.

FIG. 3 is a perspective view of a main portion obtained by cutting a part representing a rotation base portion 45 of the lid 17. The lock protruding plates 15 project from the outer surface of the side wall 29 which is along a side 47 (see FIG. 2) of the opening 31. In the present embodiment, two lock protruding plates 15 are provided being arranged apart from each other in a direction along the side 47. The lock protruding plate 15 is formed in a rectangular shape having a long side along the side 47. The lock protruding plate 15 has an inclined top end surface 49 that inclines downward toward a projecting top end (i.e. tip end) on an upper surface thereof. The inclined tip end surface 49 serves as a guide surface when the lid 17 is vertically fitted and attached to the housing 13. A lower surface of the lock protruding plate 15 opposite to the inclined tip end surface 49 serves as a flat lock surface 51 perpendicular to the side wall 29. A hook 53 of the lid 17 is hooked (locked) on the lock surface 51 of the lock protruding plate 15.

Figure 4:
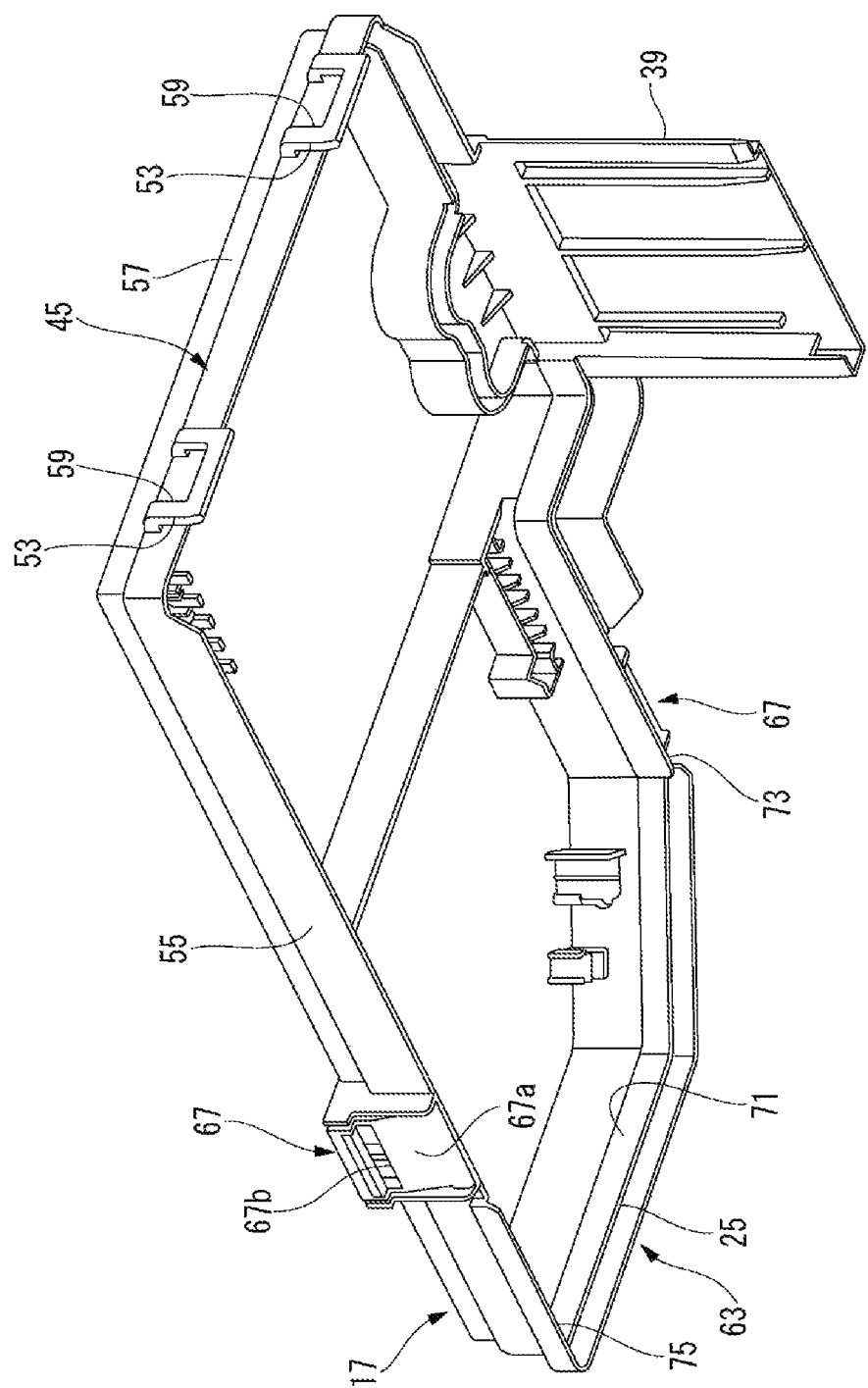
FIG. 4 is a perspective view of the lid in FIG. 1 when viewed from obliquely below.

FIG. 4 is a perspective view of the lid 17 in FIG. 1 when viewed from obliquely below. The lid 17 includes the hanging wall 55 that covers the outer side of the side wall 29. The hanging wall 55 is formed around an entire periphery of the lid 17. In the lid 17, the frame-shaped hook 53 that engages with the lock protruding plate 15 is formed on the hanging wall 55 on one side 57 of the lid 17 which is along the side 47 of the opening 31 when the lid 17 is attached to the housing 13. The hook 53 is hooked by inserting the lock protruding plate 15 into a quadrangle frame-shaped inner hole 59. By hooking the hook 53 on the lock protruding plate 15, the lid 17 locked to the housing 13 is restricted from moving upward (upward from the opening 31) and in a direction opposite to a projecting direction of the lock protruding plate 15.

Figure 5:
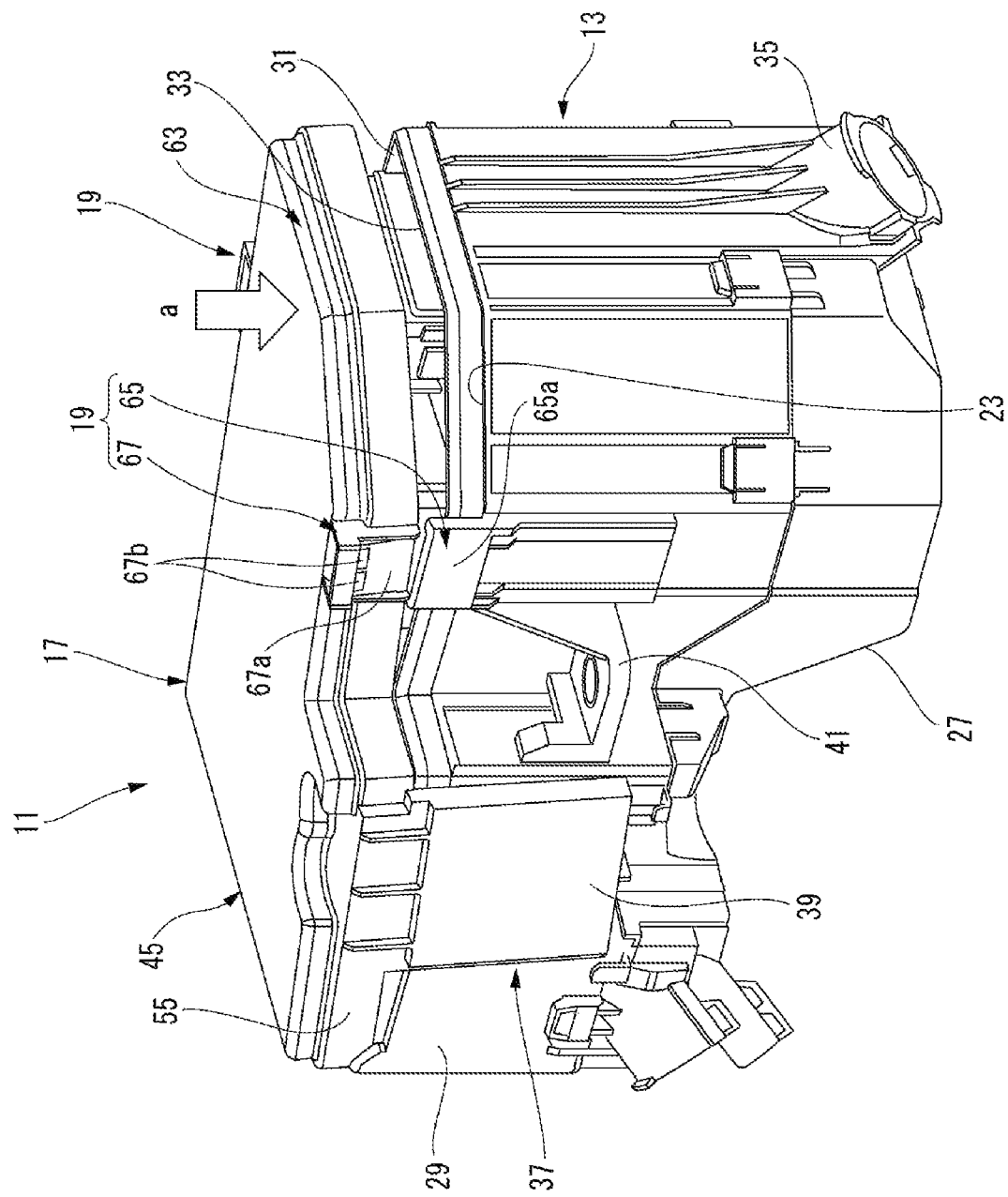
FIG. 5 is a perspective view of the electric connection box when the lid is in the middle of rotational fitting.

FIG. 5 is a perspective view of the electric connection box 11 when the lid 17 is in the middle of rotational fitting. The lid 17 is pivoted about hooks 53 locked to the lock protruding plates 15. The pivoted lid 17 covers the opening 31 and is rotationally fitted to the housing 13. In the lid 17, the side 57 of the lid 17 along the side 47 of the opening 31 serves as the rotation base portion 45 (i.e., the side 57 is the side close to the rotational axis), and another side 61 (see FIG. 2) opposite to the side 57 serves a rotation tip end portion 63 (i.e., the side 61 is the side farthest from the rotational axis in the lid 17, or second side). When the lid 17 is attached by rotational fitting to the housing 13, the rotation tip end portion 63 is pressed by an operator in a direction (arrow a) of approaching the housing 13 (i.e., a direction in which the lid is attached to the housing 13).

In the electric connection box 11 according to the present embodiment, a length L (see FIG. 2) from the side 57 serving as the rotation base portion 45 of the lid 17 to the rotation tip end portion 63 is larger than a length W (see FIG. 2) of the side 57. A length relation between the length L and the length W of the electric connection box 11 is not limited thereto.

Figure 6:
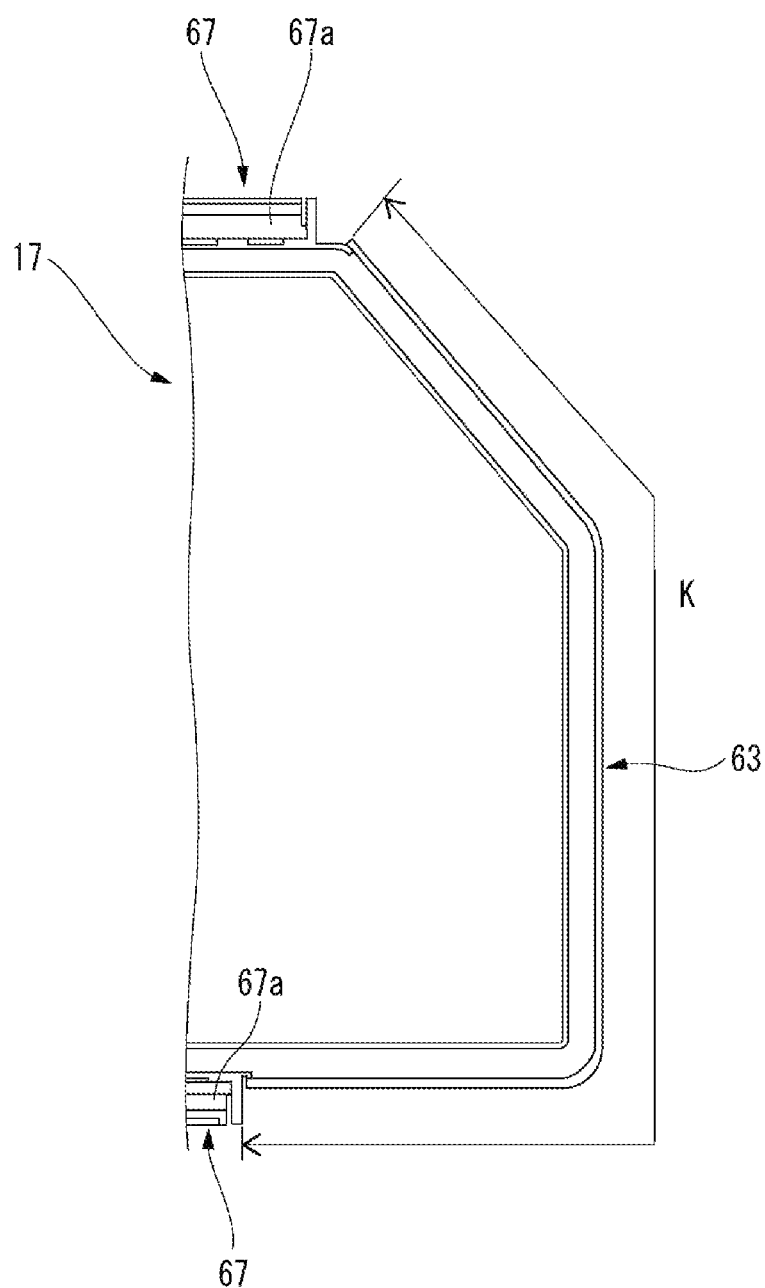
FIG. 6 is a back view in the vicinity of a rotation tip end portion of the lid.

FIG. 6 is a back view in the vicinity of the rotation tip end portion of the lid 17. The pair of lock portions 19 are provided in two positions where the rotation tip end portion 63 of the lid 17 is sandwiched therebetween. The pair of lock portions 19 are provided between the lid 17 and the housing 13. The lock portion 19 includes a housing-side lock 65 provided on the housing 13 and a lid-side lock 67 provided on the lid 17 (i.e., the pair lock portions 19 are provided in two positions, two on each of the lid 17 and the housing 13, in which the rotation tip end portion 63 of the lid 17 is being provided between the two positions.

The housing-side lock 65 includes a lock wall 65a having a lock gap between the housing-side lock 65 and the side wall 29. The lock wall 65a includes a lock claw (not illustrated) projecting into the lock gap.

The lid-side lock 67 includes a lock plate 67a to be inserted into the lock gap (see FIG. 5). The lock plate 67a has a lock hole 67b to which the lock claw is to be locked (see FIGS. 4 and 5).

Therefore, when the rotation tip end portion 63 of the lid 17 is pressed down, the lock plate 67a of the lid-side lock 67 of each of the lock portions 19 is inserted into the lock gap of the housing-side lock 65. When the rotation tip end portion 63 is further pressed down, the lock hole 67b of the lock plate 67a is locked by the lock claw of the lock wall 65a, so that the rotation tip end portion 63 is restricted from being separated from the housing 13. As a result, the lid 17 is fixed to the housing 13 by the pair of hooks 53 and the pair of lock portions 19.

Figure 7:
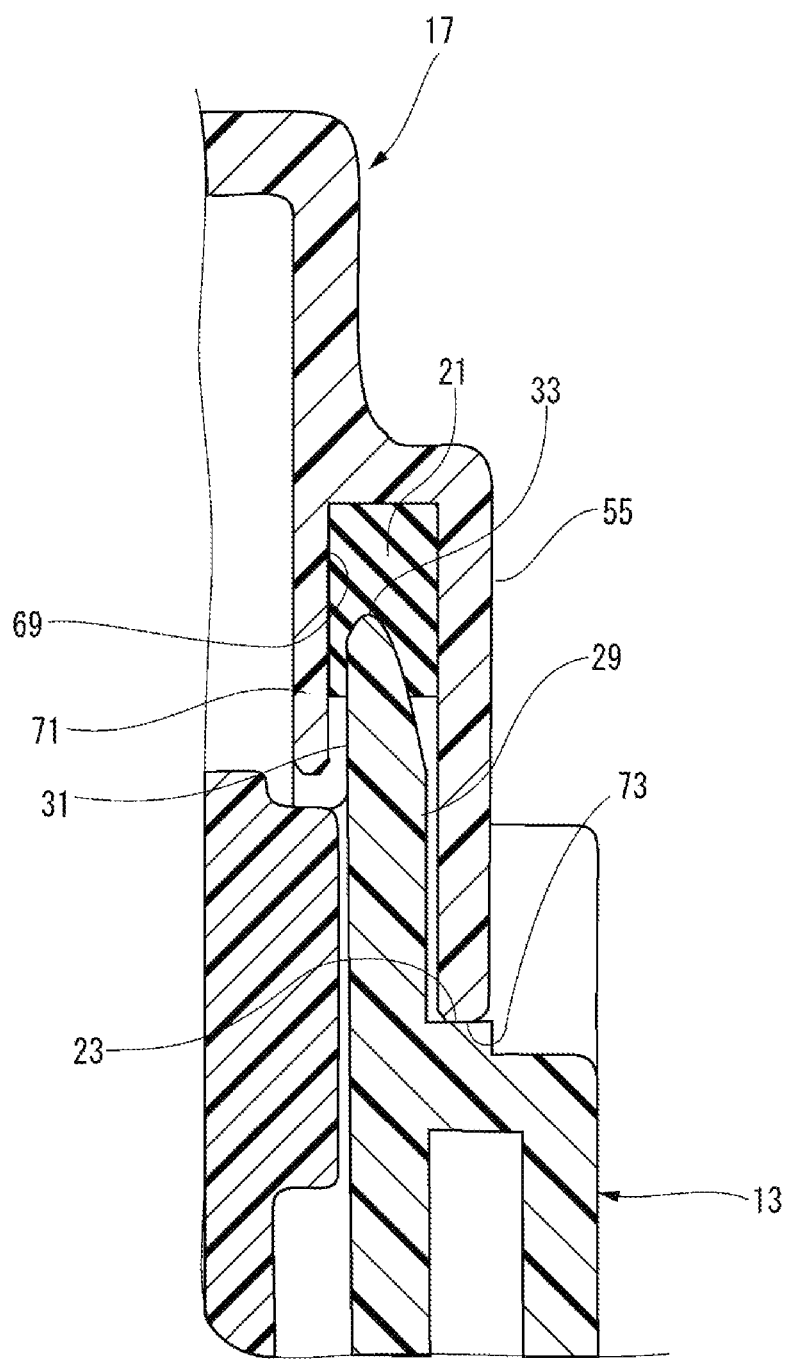
FIG. 7 is a cross-sectional view taken along a line B-B in FIG. 2.
Figure 8:
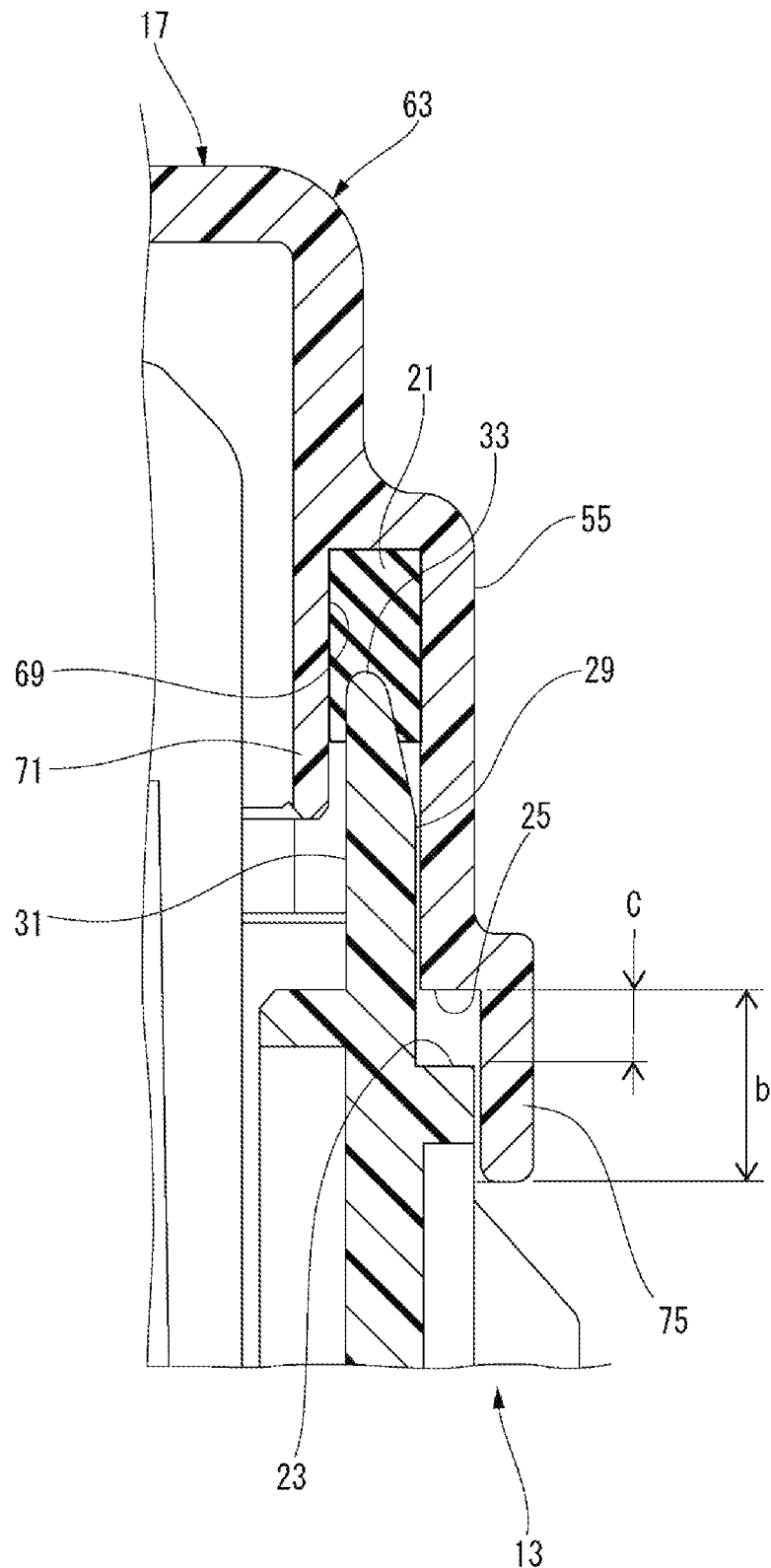
FIG. 8 is a cross-sectional view taken along a line C-C in FIG. 2.
Figure 9:
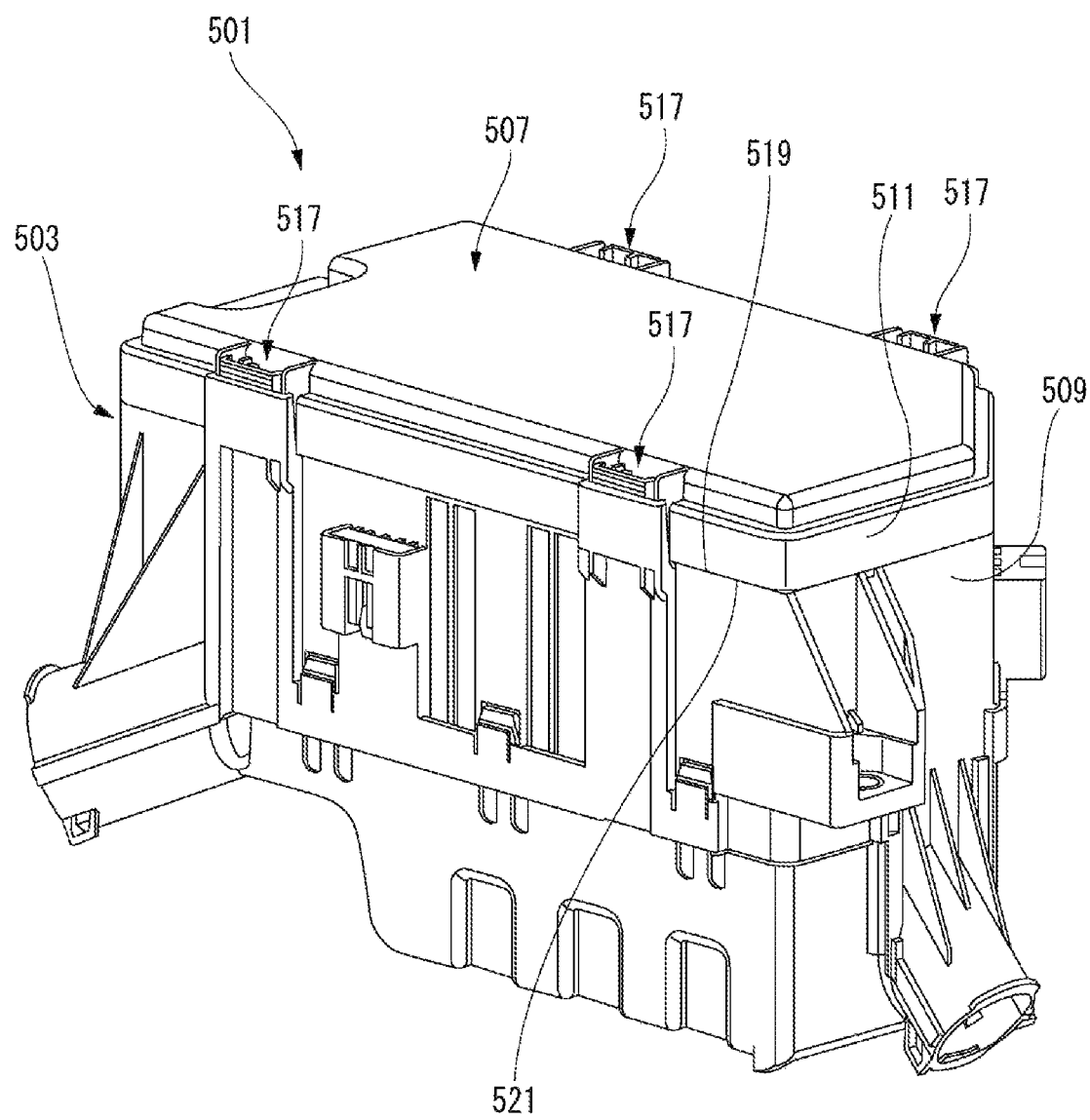
FIG. 9 is a perspective view illustrating an external appearance of an electric connection box in the related art.
Figure 10:
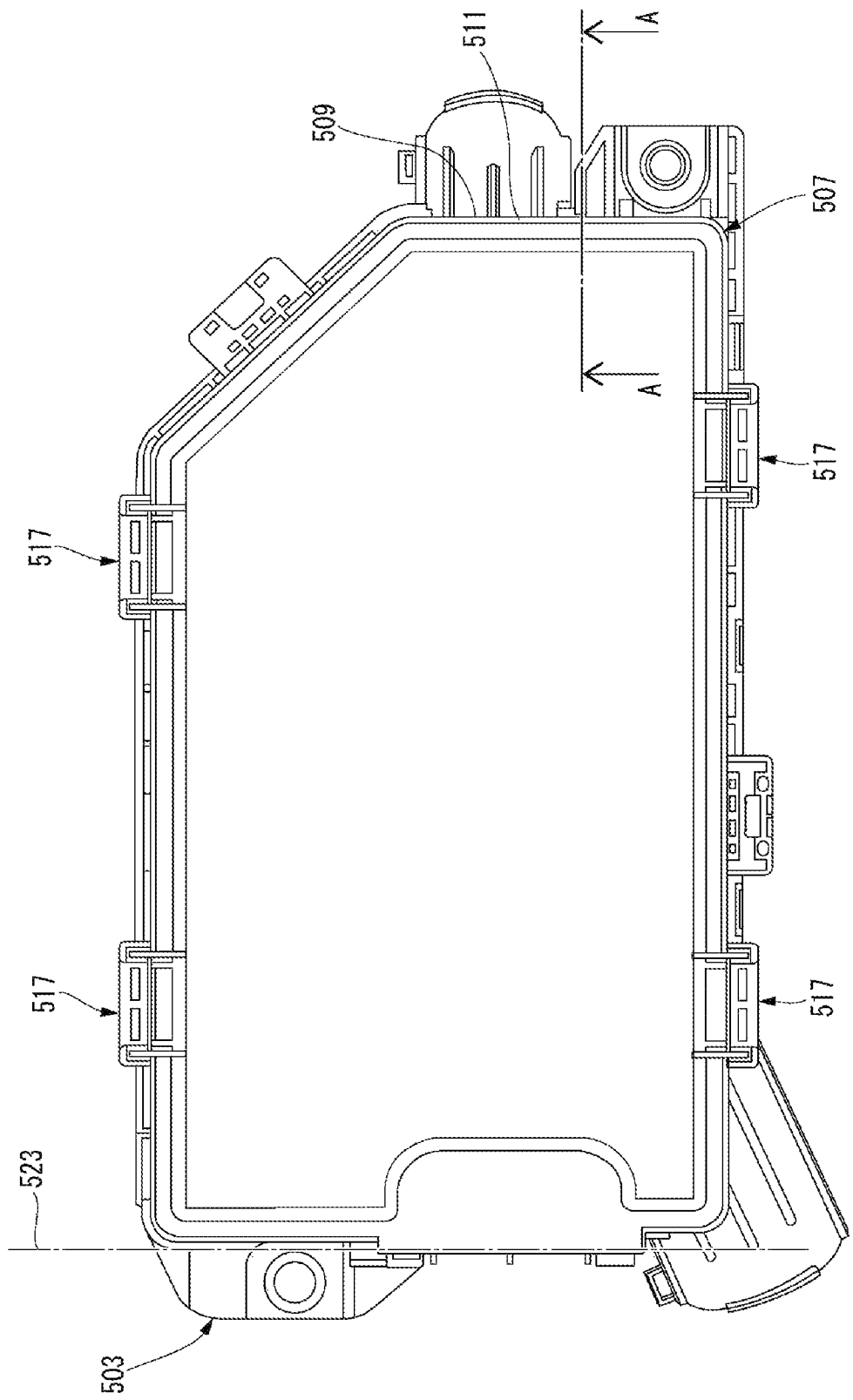
FIG. 10 is a plan view of the electric connection box in the related art.
Figure 11:
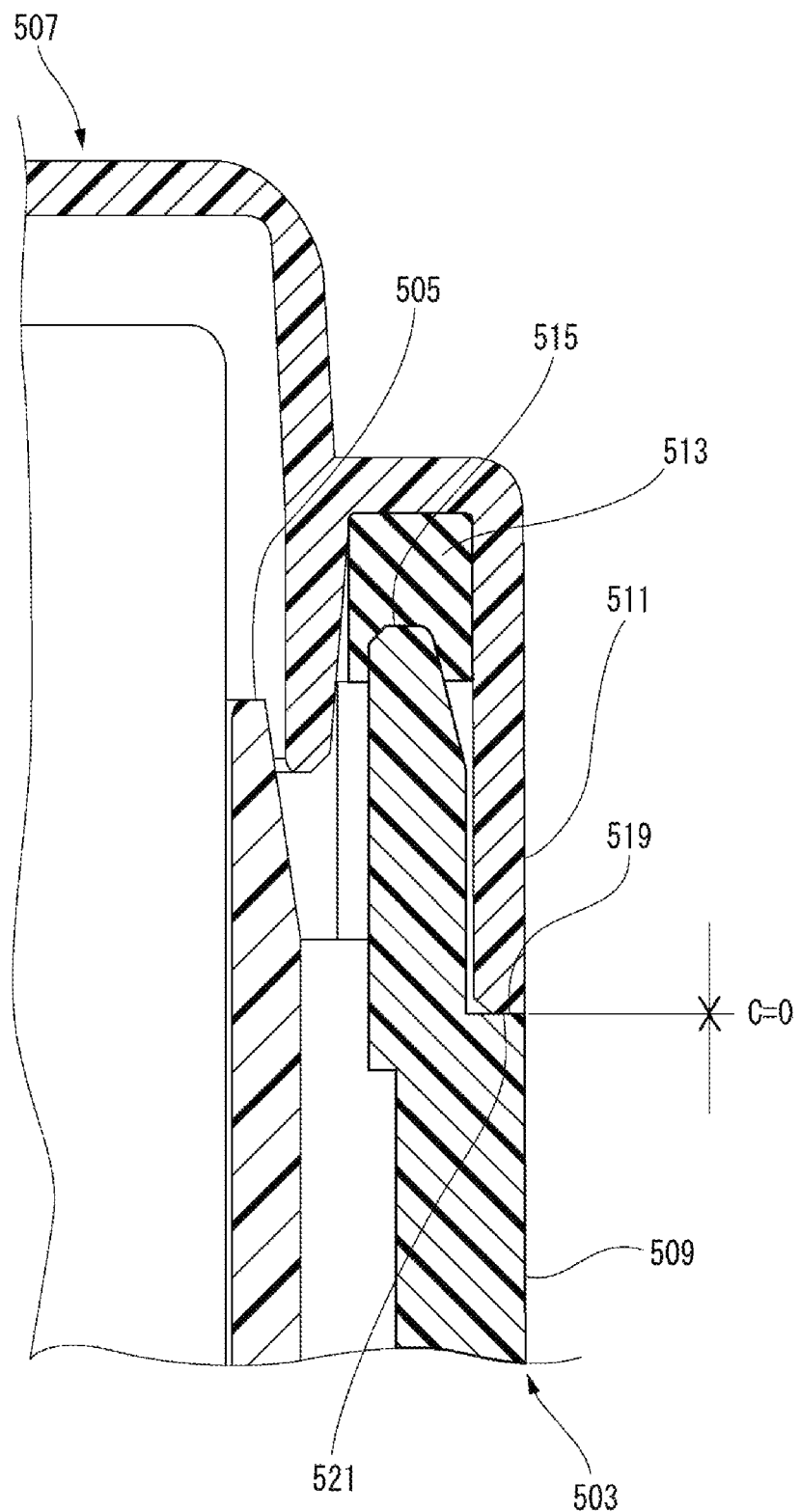
FIG. 11 is a cross-sectional view taken along a line A-A in FIG. 10.

FIGS. 7 and 8 are sectional views taken along a line B-B and a line C-C in FIG. 2. The packing 21 is formed in an annular shape, made by a linear body, having a quadrangle cross section and made of an elastic material such as rubber. The packing 21 is attached on an inner peripheral side of the hanging wall 55. The hanging wall 55 includes, on an inner side thereof, an inner wall 71 that faces the hanging wall 55 and defines a packing accommodating groove 69 opening toward the housing 13 (opening downward). The inner wall 71 hangs downward from the lid 17 in parallel to the hanging wall 55. The packing 21 is held above a hanging end of the inner wall 71 (tip end of the inner wall 71) in the packing accommodating groove 69 defined by the hanging wall 55 and the inner wall 71. That is, the packing 21 is accommodated and held on a deep side (upper side in FIG. 7) of the packing accommodating groove 69.

When the lid 17 is attached to the housing 13, the packing 21 abuts against the packing abutment end surface 33 that are the upper tip ends of the side wall 29 of the housing 13 with a predetermined pressing force. As a result, the elastically deformed packing 21 is brought into contact with the packing abutment end surface 33 in a pressed manner, and a space between the housing 13 and the lid 17 is sealed in a watertight manner.

As illustrated in FIG. 5, the step portion 23 is formed over the entire periphery of the housing 13 on the outer surface of the side wall 29. As illustrated in FIG. 8, the step portion 23 has a flat surface perpendicular to the side wall 29 by forming a thick portion on the outer side of the side wall 29. A hanging wall lower end surface 73 of the rotationally fitted lid 17 abuts against this flat surface when the lid is attached to the housing 13.

The cutout portion 25 is formed on the hanging wall 55 in a range K (structure added range K, or first portion) illustrated in FIG. 6, which is between the pair of lock portions 19. As illustrated in FIG. 8, the cutout portion 25 is configured such that the hanging wall lower end surface 73 is provided upward from the step portion 23 so that a clearance C (first clearance C) between the hanging wall lower end surface 73 and the step portion 23 is larger than those (second clearance) at other portions (portions other than the range K, or second portion). The former clearance C (first clearance C) is set to, for example, 2.0 mm. As illustrated in FIG. 4, the cutout portion 25 is disposed above the hanging wall lower end surface 73 of the other portions. The latter clearance C (second clearance C) may be not present (C=0) in the other portions. Even if the latter clearance C (second clearance C) is present in the other portions, it is desirable to have it to be less than around 0.1 mm.

The electric connection box 11 according to the present embodiment includes a hanging wall extension portion 75 provided on the hanging wall 55 in the range in which the cutout portion 25 is provided. The hanging wall extension portion 75 protrudes from a lower end of the cutout portion 25 and hangs downward along the outer side of the side wall 29 such that the hanging wall extension portion 75 covers the clearance C from the outside. A hanging length b from the cutout portion 25 to a lower end of the hanging wall extension portion 75 is set to be about 5.0 mm.

In the electric connection box 11 according to the present embodiment, the lid 17 is rotationally fitted to the housing 13. In rotational fitting, the lid 17 is pivoted about the hooks 53 by engaging the hooks 53 provided on the lid 17 with the lock protruding plates 15 provided on the side wall 29 along the side 47 of the housing 13. That is, the side 57 of the lid 17 (side 57 of the lid 17 along the side 47 of the opening 31, or first side) serves as the rotation base portion 45 (rotational axis), and the other side 61 opposite to the side 57 serves as the rotation tip end portion 63. The hooks 53 are provided on the hanging wall 55 formed on the outer periphery of the lid 17. The hanging wall 55 covers the outer side of the side wall 29 of the housing 13. The annular packing 21 is attached on the inner peripheral side of the hanging wall 55. When the lid 17 is rotationally fitted to the housing 13, the packing 21 abuts against the packing abutment end surface 33 serving as the upper ends of the side wall 29 in a watertight manner. As a result, the space between the lid 17 and the opening 31 of the housing 13 is sealed in a watertight manner.

The housing 13 includes the step portion 23 projecting from the outer surface on the outer periphery of the side wall 29. The step portion 23 abuts against the hanging wall lower end surface 73 of the lid 17, which has been rotationally fitted to the housing 13, or faces the hanging wall lower end surface 73 with a fairly small clearance (about 0.1 mm). The step portion 23 and the hanging wall lower end surface 73 substantially abut against each other, so that water can be prevented from entering.

The lid 17 is pivoted about the hooks 53 of the rotation base portion 45 that are engaged with the lock protruding plates 15. The packing 21 gradually comes into contact with and is pressed against the packing abutment end surface 33 from the rotation base portion 45, and finally the rotation tip end portion 63 is pressed against the packing abutment end surface 33. Therefore, a repulsive force of the packing 21 gradually increases toward the rotation tip end portion 63. As a result, when the rotation tip end portion 63 is pressed against the housing 13, the lid 17 may be deformed between the rotation base portion 45 and the rotation tip end portion 63 due to the repulsive force of the packing 21. When the lid 17 is deformed, the hanging wall lower end surface 73 of the rotation tip end portion 63 abuts against the step portion 23 first, making further pressing impossible. In this state, it may be more difficult for the hanging wall lower end surface 73 of the lid 17 to abut the step portion 23 on the rotation base portion side than on the rotation tip end portion 63. In this case, the lock portions 19 in the vicinity of the rotation tip end portion may not reach positions at which a reliable lock of the lock portions can be realized, and the lid 17 may end up being in a half-fitted state with the housing (i.e., the lid 17 may not be attached to the housing 13 completely).

In view of this, the lid 17 includes the cutout portion 25 on the hanging wall 55 at the rotation tip end portion 63. The cutout portion 25 is configured, when the lid is attached to the housing 13, such that the hanging wall lower end surface 73 is spaced apart from the step portion 23 so that the clearance C between the hanging wall lower end surface 73 and the step portion 23 is larger than a clearance at other portions. Since the lid 17 includes the cutout portion 25, the hanging wall lower end surface 73 of the rotation tip end portion 63 does not abut against the step portion 23 first even when the deformation occurs due to the repulsive force of the packing 21. Compared with a related-art case, the lid 17 can be rotated in a closing direction (a direction in which the lid 17 is moved toward the housing 13 such that the lid 17 closes the opening of the housing 13) by a larger amount by virtue of the provision of the clearance C formed by the cutout portion 25. That is, a fair pressing margin is ensured to complete locking of the lock portions 19, which are subject to being separated from the housing 13 due to the deformation of the lid 17. As a result, the half-fitting of the lid 17 is prevented even when the electric connection box 11 is rotationally fitted.

In the electric connection box 11 according to the present embodiment, since the cutout portion 25 is provided on the hanging wall 55 of the lid 17, the hanging wall lower end surface 73 of the rotation tip end portion 63 does not abut against the step portion 23 first even when the lid 17 is deformed due to the repulsive force of the packing 21. As a result, the lid 17 can be rotated and pushed further in the closing direction for the amount of the clearance C present due to the cutout portion 25. Therefore, by the rotation tip end portion 63 of the lid 17 being rotated in the closing direction by a larger amount, the lock portions 19 separated from the housing 13 due to the deformation of the lid 17 complete the locking.

When a pressing force by the operator is released after the lock portions 19 complete the locking by pressing the lid 17 for the amount of the clearance C at the cutout portion 25, the clearance C is formed between the cutout portion 25 and the step portion 23 due to the elastic repulsive force of the packing 21. The clearance C of the range where the cutout portion 25 is provided is larger than a clearance at other portions.

In the electric connection box 11 according to the present embodiment, the hanging wall extension portion 75, bending in a crank shape, protrudes from the lower end of the cutout portion 25 and hangs downward along the outer side of the side wall 29. After the locking is completed, the hanging wall extension portion 75 covers the large clearance C, which is provided between the cutout portion 25 and the step portion 23, at the same surface as the outer surface of the hanging wall 55. As a result, in the electric connection box 11 according to the present embodiment, water is prevented from entering from the cutout portion 25 provided to prevent the half-fitting of the lock portions 19.

In the electric connection box 11 according to the present embodiment, the length L (first length) of the lid (17) from the side 57 (first side 57) serving as the rotation base portion 45 of the lid 17 to the rotation tip end portion 63 is larger than the length W (second length) of the side 57 serving as the rotation base portion 45 of the lid 17. The hooks 53 through which a rotational axis X of the rotational fitting passes are provided on the side 57 serving as the rotation base portion 45 of the lid 17. That is, a rotation radius of the lid 17 is larger than the length W of the side 57 serving as the rotation base portion 45. In a case of such a lid 17, when the rotation base portion 45 is used as a fulcrum and the rotation tip end portion 63 is pressed, the deformation amount due to the elastic repulsive force of the packing 21 is larger than that in a case where the rotation radius is smaller than the length of one side 57 serving as the rotation base portion 45. In addition, when an external appearance of the lid 17 in a plan view is not line-symmetric relative to a line segment orthogonal to the rotational axis X, the deformation amount may be large in the vicinity of a specific one of the lock portions 19.

In the electric connection box 11 according to the present embodiment, the locking of the lock portions 19 can be reliably completed since the rotation tip end portion 63 of the lid 17 is rotated in the closing direction by a larger amount even when such large deformation occurs. Therefore, an effect of preventing the half-fitting of the lock portions 19 can be more fairly exhibited in the electric connection box 11 in which the length L from the side 57 serving as the rotation base portion 45 of the lid 17 to the rotation tip end portion 63 is larger than the length W of the side 57 serving as the rotation base portion 45 of the lid 17, or in the electric connection box 11 in which the lid 17 is not line-symmetric relative to the line segment orthogonal to the rotational axis X.

Therefore, the half-fitting of the lid 17 can be prevented according to the electric connection box 11 in the present embodiment.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, an electric connection box (11) includes a housing (13) having an opening (31) in a polygonal shape and a plurality of side walls (29), each having a packing abutment end surface (33) on an upper end, a lock protruding plate (15) protruding from an outer surface of one of the plurality of side walls (29), the one defining a side (47) of the opening (31), a lid (17) including a hanging wall (55) having a hanging wall lower end surface (73) and a hook (53) having a frame shape, the lid (17) being configured to be rotationally fitted to the housing (13), a pair of lock portions (19) configured to fix the lid (17) to the plurality of side walls (29) and provided on two positions on each of the lid (17) and the housing (13), a rotation tip end portion (63) of the lid (17) being provided between the two positions, an annular packing (21) configured to be attached on an inner peripheral side of the hanging wall (55), a step portion (23) formed on the outer surface of each of the plurality of side walls (29) and configured to, when the lid (17) is attached to the housing (13), abut the hanging wall lower end surface (73) and a cutout portion (25) provided on the hanging wall (55) on a first portion of the lid (17), the first portion including the rotation tip end portion (63). The hanging wall (55) is configured to, when the lid (17) is attached to the housing (13), cover an outer side of each of the plurality of side walls (29). The hook (53) is provided on the hanging wall (55) and configured to be engaged with the lock protruding plate (15). A rotational axis runs through the hook (53) engaged with the lock protruding plate (15). The lid (17) is configured to be rotated to cover the opening (31) about the rotational axis and to be fitted to the housing (13). The cutout portion (25) is formed by cutting a lower tip end of the hanging wall (55) such that a first clearance (C) between the hanging wall lower end surface (73) and the step portion (23) at the first portion is larger than a second clearance (C) between the hanging wall lower end surface (73) and the step portion (23) at a second portion of the lid (17) when the lid (17) is attached to the housing (13), the second portion being different from the first portion.

According to the electric connection box having the above described configuration, the lid is rotationally fitted to the housing. In rotational fitting, the lid is rotated about the hook by engaging the hook provided on the lid with the lock protruding plate provided on the side wall which is along a side of the housing. That is, a side of the lid (side of the lid along the side of the opening) serves as the rotation base portion (i.e., rotational axis), and the other side opposite to the side (i.e., the side at which the rotational axis runs) serves as the rotation tip end portion (i.e., the portion of the lid which is farthest from the rotational axis). The hook is provided on the hanging wall formed on the outer periphery of the lid. The hanging wall covers the outer side of the side wall of the housing. The annular packing is attached on the inner peripheral side of the hanging wall. When the lid is rotationally fitted to the housing, the packing abuts against the packing abutment end surface, which serves as the upper end of the side wall, in a watertight manner. As a result, the space between the lid and the opening of the housing is sealed in a watertight manner. The housing includes the step portion projecting from the outer surface on the outer periphery of the side wall. The step portion abuts, when the lid is rotated toward the housing, against the hanging wall lower end surface of the lid rotationally or faces the hanging wall lower end surface at a fairly small clearance. The step portion and the hanging wall lower end surface substantially abut against each other, so that water can be prevented from entering. Further, the lid includes the cutout portion on the hanging wall at a portion (first portion) comprising the rotation tip end portion. The cutout portion is firmed such that the hanging wall lower end surface is spaced apart from the step portion at the rotation tip end portion so that the clearance between the hanging wall lower end surface and the step portion at the portion comprising the rotation tip end portion is larger than a clearance at other portions (second portion of the lid). Since the lid includes the cutout portion, the hanging wall lower end surface of the rotation tip end portion does not abut against the step portion first even when the deformation occurs due to a repulsive force of the packing. Compared with a related-art case, the lid can be rotated in a closing direction by a larger amount for the amount of the clearance present due to the cutout portion. That is, a fair pressing margin is ensured to complete locking of the lock portion which tends to be separated from the housing even when the lid is rotated and pushed toward the housing due to the deformation of the lid. As a result, the half-fitting of the lid is prevented even when the lid of the electric connection box is rotationally fitted.

The electric connection box (11) may further include a hanging wall extension portion (75) formed on the hanging wall (55) at the first portion, the hanging wall extension portion (75) extending downward from a lower end of the cutout portion (25), the hanging wall extension portion (75) being configured to, when the lid (17) is attached to the housing (13), extend along the outer side of the side wall (29) to cover the first clearance (C).

According to the electric connection box having the above described configuration, when a pressing force by an operator is released after the lock portion completes the locking by the lid being pushed by the amount of the clearance at the rotation tip end portion where the cutout portion is provided, the clearance is defined, due to the elastic repulsive force of the packing, between the cutout portion and the step portion. The clearance at the rotation tip end portion where the cutout portion is provided is larger than a clearance at other portions. In the electric connection box having such a configuration, the hanging wall extension portion bending in a crank shape extends from the lower end of the cutout portion and hangs downward along the outer side of the side wall. After the locking is completed, the hanging wall extension portion covers the large clearance between the cutout portion and the step portion with the same surface as the outer surface of the hanging wall. As a result, in the electric connection box having such a configuration, water is prevented from entering from the rotation tip end portion where the cutout portion, which is for preventing half-fitting of the lock portion is provided.

In the electric connection box (11), a first length (L) of the lid (17) from a first side (57) of the lid (17), the first side (57) serving as a rotation base portion (45) of the lid (17), to the rotation tip end portion (63) may be larger than a second length (W) of the first side (57) of the lid (17), the first side (57) serving as the rotation base portion (45).

In the electric connection box having the above described configuration, the length of the lid from the side serving as the rotation base portion of the lid to the rotation tip end portion is larger than the length of the side of the lid serving as the rotation base portion of the lid. The hook serving as the rotational axis of the rotational fitting is provided on the side serving as the rotation base portion of the lid. That is, a rotation radius of the lid is larger than the length of the side serving as the rotation base portion. In a case of such a lid, when the rotation base portion is used as a fulcrum of rotation and the rotation tip end portion is pressed, the deformation amount due to the elastic repulsive force of the packing is larger than deformation amount in a case where the rotation radius is smaller than the length of the side serving as the rotation base portion. In addition, when an external appearance of the lid in a plan view is not line-symmetric relative to a line segment orthogonal to a rotational axis, the distortion may be large in the vicinity of a specific one of the lock portions. In the electric connection box having the configuration mentioned above, the locking of the lock portion can be reliably completed since the rotation tip end portion of the lid is rotated and pushed in the closing direction by a larger amount even when such large deformation occurs. Therefore, an effect of preventing the half-fitting of the lock portion can be more fairly exhibited in the electric connection box in which the length of the lid from the side serving as the rotation base portion of the lid to the rotation tip end portion is larger than the length of the side serving as the rotation base portion of the lid, or in the electric connection box in which the lid is not line-symmetric relative to the line segment orthogonal to the rotational axis.

In the electric connection box (11), the rotational axis may run along the side (47) of the opening (31).

In the electric connection box (11), the rotation tip end portion (63) may be a second side (63) of the lid (17) being opposed to a first side (57) of the lid (17). The first side (57) may be, when the lid (17) is attached to the housing (13), along and in the vicinity of the rotational axis.

In the electric connection box (11), the first side (57) may be provided closer to the rotational axis than the second side (63).

In the electric connection box (11), the hanging wall extension portion (75) may protrude outward along a direction orthogonal to the hanging wall (55), the hanging wall extension portion (75) bending such that the hanging wall extension portion (75) further extends, when the lid (17) is attached to the housing (13), downward along the outer side of the side wall (29).

What is claimed is:

1. An electric connection box comprising:
a housing comprising: an opening in a polygonal shape; and a plurality of side walls, each comprising a packing abutment end surface on an upper end;
a lock protruding plate protruding from an outer surface of one of the plurality of side walls, the one defining a side of the opening;
a lid comprising: a hanging wall having a hanging wall lower end surface; and a hook having a frame shape, the lid being configured to be rotationally fitted to the housing;
a pair of lock portions configured to fix the lid to the plurality of side walls and provided on two positions on each of the lid and the housing, a rotation tip end portion of the lid being provided between the two positions;
an annular packing configured to be attached on an inner peripheral side of the hanging wall;
a step portion formed on the outer surface of each of the plurality of side walls and configured to, when the lid is attached to the housing, abut the hanging wall lower end surface; and
a cutout portion provided on the hanging wall on a first portion of the lid, the first portion including the rotation tip end portion,
wherein the hanging wall is configured to, when the lid is attached to the housing, cover an outer side of each of the plurality of side walls,
wherein the hook is provided on the hanging wall and configured to be engaged with the lock protruding plate,
wherein a rotational axis runs through the hook engaged with the lock protruding plate,
wherein the lid is configured to be rotated to cover the opening about the rotational axis and to be fitted to the housing, and
wherein the cutout portion is formed by cutting a lower tip end of the hanging wall such that a first clearance between the hanging wall lower end surface and the step portion at the first portion is larger than a second clearance between the hanging wall lower end surface and the step portion at a second portion of the lid when the lid is attached to the housing, the second portion being different from the first portion.

2. The electric connection box according to claim 1, further comprising:
a hanging wall extension portion formed on the hanging wall at the first portion, the hanging wall extension portion extending downward from a lower end of the cutout portion, the hanging wall extension portion being configured to, when the lid is attached to the housing, extend along the outer side of the side wall to cover the first clearance.

3. The electric connection box according to claim 1,
wherein a first length of the lid from a first side of the lid, the first side serving as a rotation base portion of the lid, to the rotation tip end portion is larger than a second length of the first side of the lid.

4. The electric connection box according to claim 1,
wherein the rotational axis runs along the side of the opening.

5. The electric connection box according to claim 1,
wherein the rotation tip end portion is a second side of the lid being opposed to a first side of the lid, and
wherein the first side of the lid is, when the lid is attached to the housing, along and in the vicinity of the rotational axis.

6. The electric connection box according to claim 5,
wherein the first side is provided closer to the rotational axis than the second side.

7. The electric connection box according to claim 2,
wherein the hanging wall extension portion protrudes outward along a direction orthogonal to the hanging wall, the hanging wall extension portion bending such that the hanging wall extension portion further extends, when the lid is attached to the housing, downward along the outer side of the side wall.

* * * * *